US 8,503,900 B2

(12) United States Patent
Inukai

(10) Patent No.: US 8,503,900 B2
(45) Date of Patent: Aug. 6, 2013

(54) POWER SUPPLY UNIT AND IMAGE FORMING DEVICE HAVING THE SAME

(75) Inventor: Katsumi Inukai, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 904 days.

(21) Appl. No.: 12/541,583

(22) Filed: Aug. 14, 2009

(65) Prior Publication Data

US 2010/0054790 A1 Mar. 4, 2010

(30) Foreign Application Priority Data

Aug. 29, 2008 (JP) ................................ 2008-222045

(51) Int. Cl.
*G03G 15/00* (2006.01)
(52) U.S. Cl.
USPC ................ 399/88; 399/89; 399/90; 361/91.1; 307/86; 307/87; 307/130
(58) Field of Classification Search
USPC .............................................. 399/37, 88, 89
See application file for complete search history.

(56) References Cited

U.S. PATENT DOCUMENTS

| | | | | |
|---|---|---|---|---|
| 3,893,006 | A * | 7/1975 | Algeri et al. | 361/227 |
| 4,185,234 | A * | 1/1980 | Baker | 315/411 |
| 4,236,198 | A * | 11/1980 | Ohsawa et al. | 363/49 |
| 4,945,255 | A * | 7/1990 | Suzuki et al. | 307/17 |
| 5,933,049 | A * | 8/1999 | Melse | 363/21.13 |
| 6,057,999 | A * | 5/2000 | Park et al. | 361/91.1 |
| 6,229,681 | B1 * | 5/2001 | Lee | 361/92 |
| 6,738,247 | B2 * | 5/2004 | Uchida | 361/93.1 |
| 6,963,701 | B2 * | 11/2005 | Inukai | 399/66 |
| 7,400,063 | B2 | 7/2008 | Iwashita | |
| 7,638,902 | B2 * | 12/2009 | Hwang | 307/130 |
| 2002/0176719 | A1 * | 11/2002 | Yogome et al. | 399/81 |

(Continued)

FOREIGN PATENT DOCUMENTS

| | | |
|---|---|---|
| JP | 63272281 A * | 11/1988 |
| JP | 2001-086742 A | 3/2001 |

(Continued)

OTHER PUBLICATIONS

English human-translation of Japanese patent document Ikeuchi (JP 63272281 A); by Ikeuchi, Hiroshi; published Nov. 9, 1988.*

*Primary Examiner* — David Gray
*Assistant Examiner* — Geoffrey Evans
(74) *Attorney, Agent, or Firm* — Baker Botts L.L.P.

(57) ABSTRACT

There is provided a power supply unit, comprising: a converter transformer; a first low voltage generation unit to generate a first voltage on a secondary side of the converter transformer and output the first voltage; a first controller that controls an activation state of a primary side of the converter transformer based on the first voltage; an inactivation unit to inactivate operation of the first controller based on the first voltage to let the first low voltage generation unit to suspend output of the first voltage; a high voltage supply unit to output a high voltage higher than the first voltage by using the first voltage; a detection unit to detect an anomalous state concerning output of the high voltage of the high voltage supply unit. The high voltage supply unit inactivates the operation of the first controller through the inactivation unit when the anomalous state is detected.

9 Claims, 7 Drawing Sheets

U.S. PATENT DOCUMENTS

| | | | |
|---|---|---|---|
| 2008/0304851 A1* | 12/2008 | Kim et al. | 399/88 |
| 2010/0166449 A1* | 7/2010 | Hong | 399/88 |
| 2011/0158674 A1* | 6/2011 | Inukai | 399/88 |
| 2012/0114363 A1* | 5/2012 | Inukai | 399/88 |
| 2012/0134707 A1* | 5/2012 | Inukai | 399/88 |
| 2012/0301172 A1* | 11/2012 | Odate et al. | 399/88 |

FOREIGN PATENT DOCUMENTS

| | | |
|---|---|---|
| JP | 2001-277577 A | 10/2001 |
| JP | 2003-230072 A | 8/2003 |
| JP | 2004-180433 A | 6/2004 |

* cited by examiner

POWER SUPPLY UNIT AND IMAGE FORMING DEVICE HAVING THE SAME

CROSS-REFERENCE TO RELATED APPLICATION

This application claims priority under 35 U.S.C. §119 from Japanese Patent Application No. 2008-222045, filed on Aug. 29, 2008. The entire subject matter of the application is incorporated herein by reference.

BACKGROUND

1. Technical Field

Aspects of the present invention relate to a power supply unit and an image forming device having the power supply unit.

2. Related Art

In general, a power supply unit is provided in an image forming device to supply voltages to components in the image forming device. Japanese Patent Provisional Publication No. 2001-086742A discloses a technique in which a voltage is outputted on a secondary side of a converter transformer, and switching control is performed for controlling an activation state of a primary side of the converter transformer based on an output voltage on the primary side of the converter transformer.

Regarding an image forming device having a cover through which a user can access a high voltage generation circuit provided in the image forming device to generate a high voltage, a technique where high voltage output is cut off with an interlock switch when the cover is opened has been proposed.

SUMMARY

However, use of such an interlock switch hampers downsizing of the power supply unit. In addition, even if the interlock switch is employed, the high voltage is kept to be outputted until the cover is opened even when anomalous high voltage output occurs. In this case, internal components to which high voltages are supplied might be damaged.

Aspects of the present invention are advantageous in that at least one of a power supply unit and an image forming device having the same configured such that when anomalous high voltage output occurs, high voltage output can be stopped while suppressing deterioration of components due to an anomalous state of the high voltage output, without increasing the size of the power supply unit is provided.

According to an aspect of the invention, there is provided a power supply unit, comprising: a first converter transformer; a first low voltage generation unit configured to generate a first voltage on a secondary side of the first converter transformer and output the first voltage; a first controller that controls an activation state of a primary side of the first converter transformer, on the primary side of the first converter transformer, based on the first voltage; an inactivation unit configured to inactivate operation of the first controller based on the first voltage to let the first low voltage generation unit to suspend output of the first voltage; a high voltage supply unit configured to output a high voltage higher than the first voltage by using the first voltage; an anomalous state detection unit configured to detect an anomalous state concerning output of the high voltage of the high voltage supply unit. In this configuration, the high voltage supply unit inactivates the operation of the first controller through the inactivation unit when the anomalous state is detected by the anomalous state detection unit.

Such a configuration makes it possible to stop output of the high voltage in accordance with detection of the anomalous state without increasing the size and cost of the power supply unit.

According to another aspect of the invention, there is provided an image forming device, comprising: the above described power supply unit; and an image formation unit configured to form an image by using the high voltage supplied by the power supply unit.

Such a configuration makes it possible to stop output of the high voltage in accordance with detection of the anomalous state without increasing the size and cost of the power supply unit.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, embodiments according to the invention will be described with reference to the accompanying drawings.

First Embodiment

Figure 1:
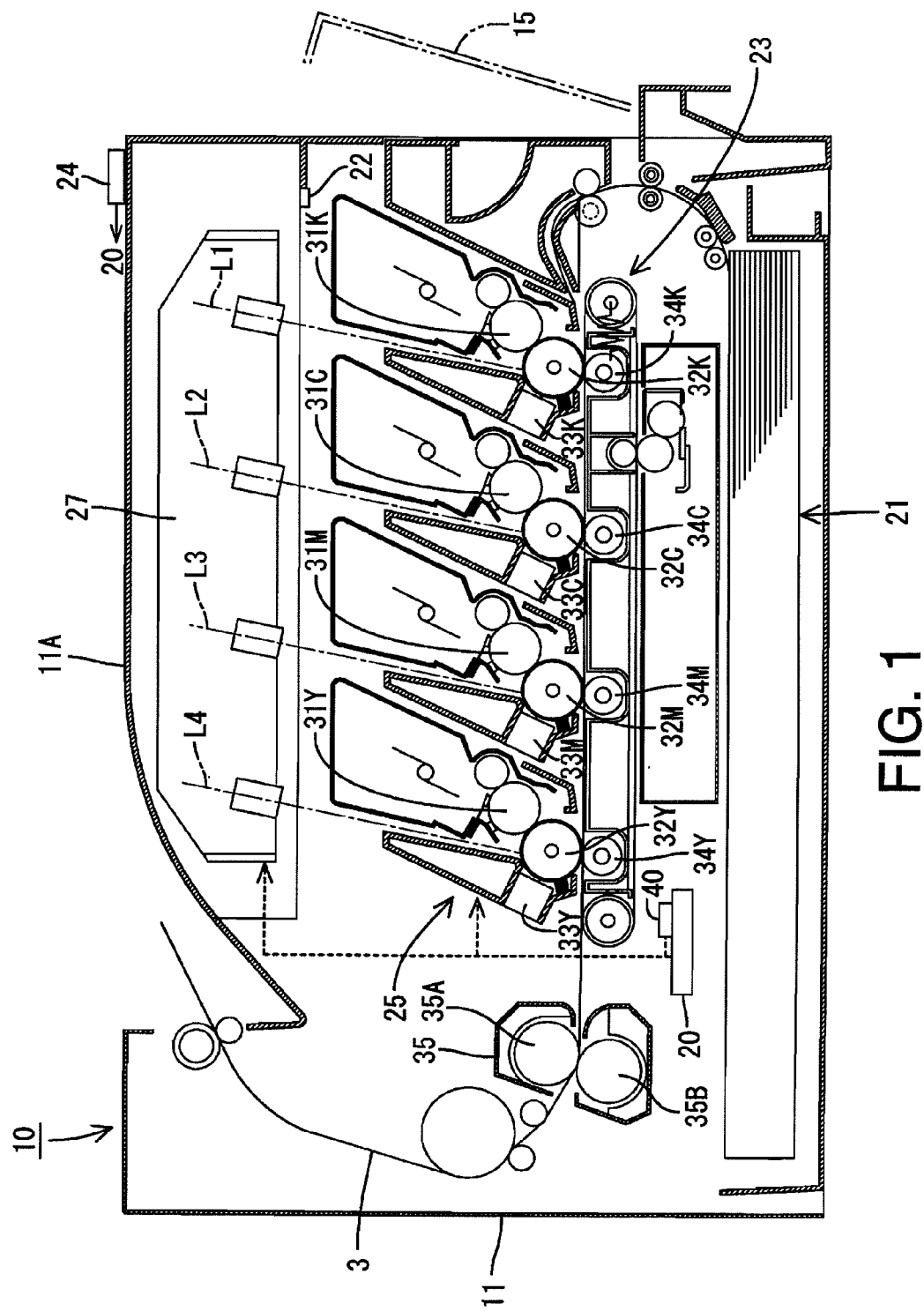
FIG. 1 is a cross section illustrating a general configuration of a laser printer according to a first embodiment.

FIG. 1 is a cross section illustrating a general configuration of a laser printer 10 according to a first embodiment.

The laser printer 10 is a so-called direct tandem type color laser printer. That is, the laser printer 10 includes four development rollers 31K, 31C, 31M and 31Y respectively corresponding to four colors of black, cyan, magenta and yellow, and four photosensitive drums 32K, 32C, 32M and 32Y respectively corresponding to four colors of black, cyan, magenta and yellow. In the following, the right side on FIG. 1 is defined as a front side of the laser printer 1. It should be noted that various types of image forming devices, such as a monochrome laser printer, an LED printer and a multifunction peripheral having facsimile and copy functions, can be employed as a device to which the feature of an embodiment is applied.

The laser printer 10 (hereafter, simply referred to as a printer 10) has a box-shaped body casing 11. In the body casing 11, a paper supply unit 21, a paper carrying unit 23 configured to carry a sheet of paper 3 as an example of a recording medium, an image formation unit 25 configured to form an image through an electrophotographic process, and a scanning unit 27 are arranged to be stacked in this order from the bottom side. Further, the printer 10 includes an electric circuit 20 which supplies various signals to the components in the printer 10. The electric circuit 20 includes a power supply unit 40 which is explained in detail below.

The development rollers 31K-31Y (hereafter, frequently referred to as development rollers 31 collectively), the photosensitive drums 32K-32Y (hereafter, frequently referred to as photosensitive drums 32 collectively), chargers 33K-33Y (hereafter, frequently referred to as chargers 33 collectively), transfer rollers 34K-34Y (hereafter, frequently referred to as transfer rollers 34 collectively) and a fixing unit 35 are included in the image formation unit 25. The fixing unit 35 includes a heat roller 35A having a heat source, and a pressure roller 35B which presses the sheet of paper 3 against the heat roller 35A so that a toner image transferred to the sheet of paper 3 is fixed by heat on the sheet of paper 3.

The front side of the body casing 11 is formed to be an access opening for accessing to the image formation unit 25 where a front cover 15 is provided to be rotatable. That is, the front cover 15 is opened by a user operation. The front cover 15 serves to open or close the access opening. An open/close sensor 22 is provided near to the front cover 15. The open/close sensor 22 generates a detection signal corresponding to an opened state or a closed state of the front cover 15, and supplies the detection signal to the electric circuit 20.

The scanning unit 27 is provided with a polygonal mirror (not shown) and four laser diodes corresponding to the four colors. Each laser beam (L1, L2, L3, L4) emitted by the laser diode is deflected by the polygonal mirror, and is further deflected by an optical component (e.g., a reflection mirror provided on an optical path) to be incident on a surface of the corresponding photosensitive drum 32 (32K-32Y). With this configuration, an electrostatic latent image is formed on each photosensitive drum 32. Thereafter, an image is formed on the sheet of paper 3 being carried on a paper carrying path through a development process, a transfer process and a fixing process. The sheet of paper after image formation is then ejected on an output tray provided on an upper wall 11A of the body casing 11.

Figure 2:
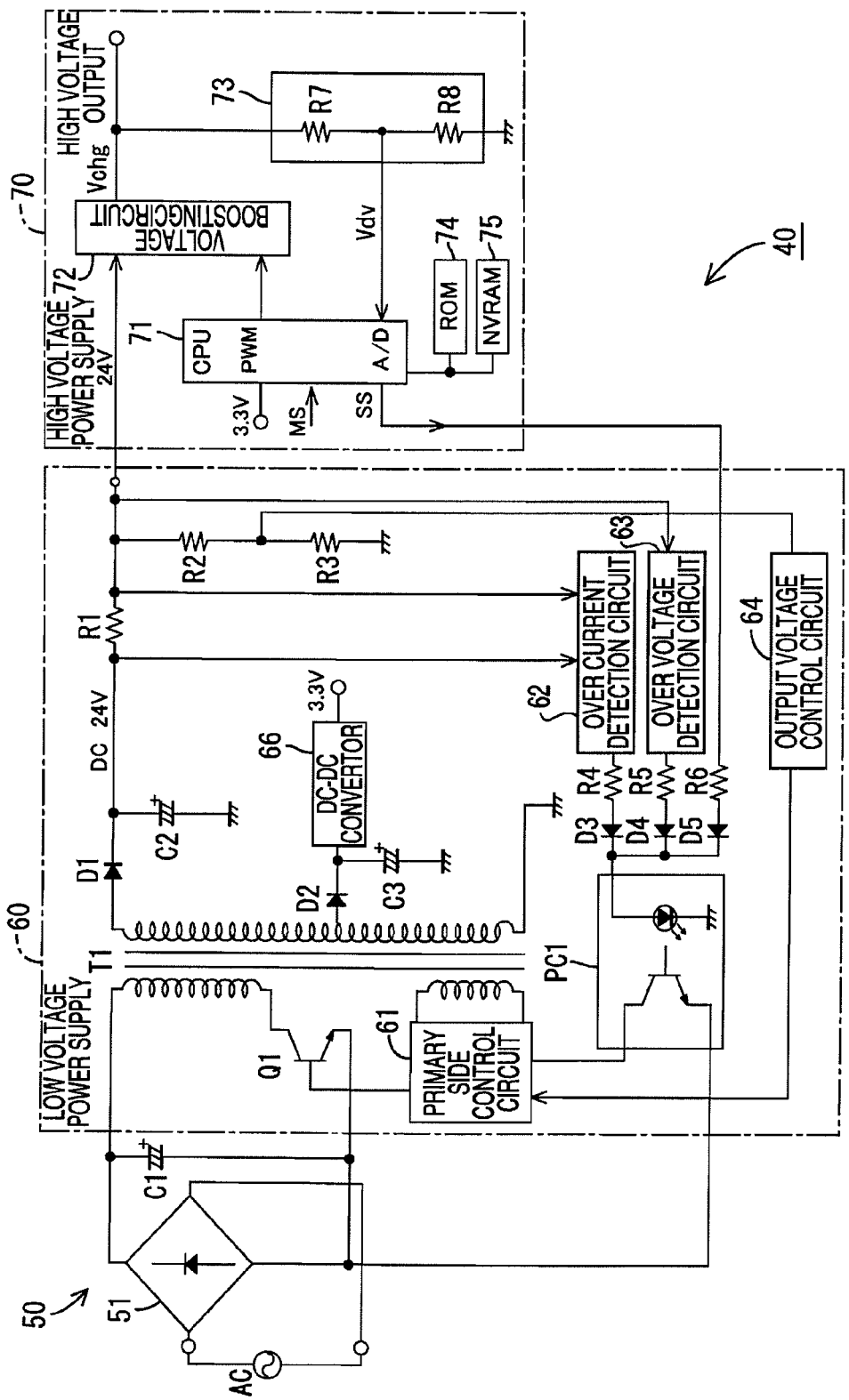
FIG. 2 is a circuit diagram f a power supply unit provided in the laser printer.

A configuration of a power supply unit 40 according to the first embodiment will now be described. FIG. 2 is a circuit diagram f the power supply unit 40. It should be noted that the power supply unit 40 can be applied to various types of devices. As shown in FIG. 2, the power supply unit 40 includes a rectifying unit 50, a low voltage power supply unit 60 and a high voltage power supply unit 70. The rectifying unit 50 includes a rectifying circuit 51 and a smoothing capacitor C1. The rectifying unit 50 rectifies an altering current (e.g. AC 100V).

The low voltage power supply unit 60 is a so-called RCC (Ringing Choke Converter), and includes a converter transformer T1, a switching transistor Q1, a primary side control circuit 61, an overcurrent detection circuit 62, an overvoltage detection circuit 63, an output voltage control circuit 64 and a photocoupler PC1.

The low voltage power supply unit 60 includes a diode D1 and a capacitor C2 on a secondary side of the converter transformer T1. The diode D1 and the capacitor C2 serve to rectify the voltage of the secondary side of the converter transformer T1 to generate DC 24V, and to supply DC 24V to a circuit (e.g., the high voltage power supply unit 70) that needs a high voltage.

The lower voltage power supply unit 60 includes a diode D2, a capacitor C3 and a DC-DC converter 66 connected to an intermediate tap of the secondary winding of the converter transformer T1. The diode D2 and the capacitor C3 serve to rectify the voltage of the intermediate tap of the secondary side of the converter transformer T1 to generate a predetermined DC voltage. The DC-DC converter 66 converts the predetermined DC voltage into a certain voltage (DC 3.3V in this embodiment), and supplies DC 3.3V to a circuit (e.g., an LCD monitor 24 provided on the body casing 11) operating in a direct current of a low voltage.

The overcurrent detection circuit 62 may include an error amplifier and a comparator. The overcurrent detection unit 62 detects current by a voltage difference of both terminals of a current detection resistance R1, and when the voltage difference exceeds a predetermined value, the overcurrent detection unit 62 supplies current to a diode of the photocoupler PC1 via the resistance R4 and the diode D3. Accordingly, a transistor of the photocoupler PC1 turns to ON, and the primary side control circuit 61 moves to a suspended state, and the low voltage power supply unit 60 shuts down.

The overvoltage detection circuit 63 includes a zener diode connected to an output line. When the output DC voltage exceeds a predetermined voltage (e.g., a zener voltage), the overvoltage detection circuit 63 supplies a predetermined current to a diode of the photocoupler PC1 via the resistance R5 and the diode D4 to shut down the low voltage power supply unit 60 as in the case of the overcurrent detection circuit 62.

The output voltage control circuit 64 includes an error amplifier and an insulating element (e.g., a photocoupler). The output voltage control circuit 64 detects the output voltage through dividing resistances R2 and R3. The error amplifier amplifies a difference between the output voltage (i.e., the divided voltage) and a reference value, and supplies the amplified signal to the photocoupler. In this case, the output voltage control circuit 64 controls the primary side control circuit 61 via the photocoupler so that the output voltage (i.e., the divided voltage) becomes equal to the reference value of the error amplifier. Further, in this case, the primary side control circuit 61 controls the activation state of the primary side of the converter transformer T1 based on the current of a transistor of a photocoupler of the output voltage control circuit 64.

The high voltage power supply unit 70 includes a CPU 71, a voltage boosting circuit 72 and a high voltage detection circuit 73. The high voltage power supply unit 70 receives DC 24V from the low voltage power supply unit 60, and generates a high voltage (e.g., a charge voltage to be applied to the charger 33, a development bias to be applied to the development roller 31 and a transfer bias to be applied to the transfer roller 34) to be supplied to the image formation unit 25 base on DC 24V. It should be noted that in FIG. 2 only a partial configuration outputting a charge voltage Vchg to be applied to the charger 33 is illustrated for the sake of simplicity.

The high voltage supply unit 70 has a high voltage output ON mode in which a regular high voltage is outputted and a high voltage output OFF mode in which high voltage output is cut off.

The voltage boosting circuit 72 may include an RCC (Ringing Choke Converter) having a converter transformer, and outputs a high voltage, such as a charge voltage Vchg of 5 kV to 8 kV. The high voltage detection circuit 73 includes dividing resistances R7 and R8, and generates a high voltage detection signal Vdv by dividing the high voltage output. Although not shown in FIG. 2, a plurality of high voltage detection circuits 73 are respectively provided for a plurality of voltage boosting circuits 72.

The CPU 71 controls the voltage boosting circuit 72, for example, by a PWM (Pulse Width Modulation) signal, based on a high voltage (i.e., a divided voltage) detected by the high voltage detection circuit 73. Furthermore, the CPU 71 receives a mode switch signal MS for turning on or off the high voltage output, and turns on or off the high voltage output in accordance with the mode switch signal MS. That is, the CPU 71 turns on or off the PWM signal in accordance with the mode switch signal MS.

Although not shown in FIG. 2, the CPU 71 includes a plurality of PWM signal generators generating a plurality of PWM signals for the plurality of voltage boosting circuits 72, and an A-D conversion unit including a plurality of A-D converters for converting high voltage detection signals Vdv respectively supplied from a plurality of high voltage detection circuits 73 into digital signals. The CPU 71 is connected with a ROM 74 storing various types of programs to be executed by the CPU 71, and an NVRAM 75 storing various types of data, such as results of processes by the CPU 71.

Figure 3:
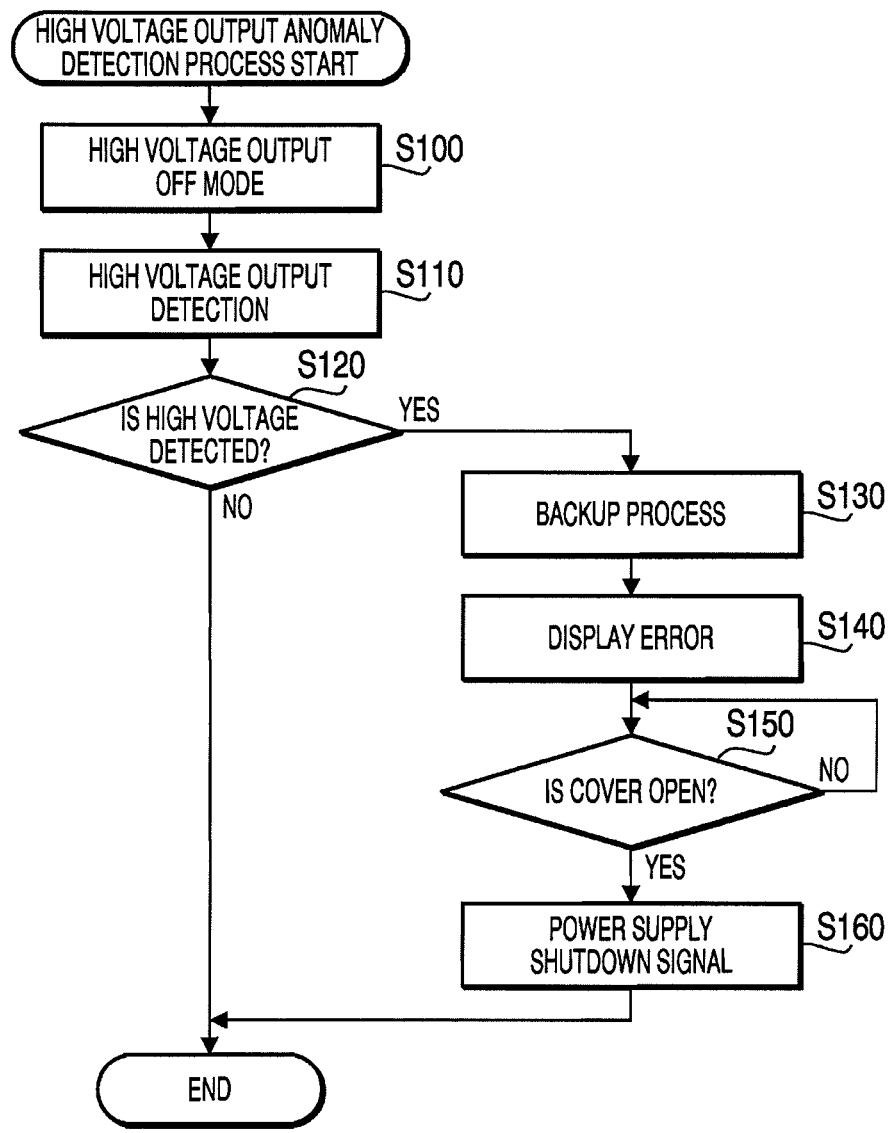
FIG. 3 is a flowchart illustrating a high voltage output anomaly detection process according to the first embodiment.

Hereafter, control for detecting high voltage anomaly is explained. FIG. 3 is a flowchart illustrating a high voltage output anomaly detection process. The high voltage output anomaly detection process is executed under control of the CPU 71 in accordance with a program stored in the ROM 74.

In step S100, the CPU 71 receives a mode switch signal MS for cutting off the high voltage output, for example, when a print command has not been received for a predetermined time period. Then, the CPU 71 moves to the high voltage output OFF mode where generation of the high voltage is stopped. At this moment, the PWM signal generator in the CPU 71 is inactivated, and the PWM signal generator stops to generate the PWM signal. In this case, the voltage boosting circuit 72 is also inactivated to stop generation of the high voltage. At this moment, the CPU 71 detects the high voltage output based on the high voltage detection signal Vdv.

Next, in step S120, the CPU 71 judges whether output of a high voltage higher than or equal to a predetermined voltage (which may be set at 0V) is detected in accordance with the high voltage detection signal Vdv. If the CPU 71 judges that the high voltage output higher than or equal to the predetermined voltage is not detected (S120: NO), the high voltage output anomaly detection process terminates.

On the other hand, if the CPU 71 judges that the high voltage output higher than or equal to the predetermined voltage is detected (S120: YES), control proceeds to step S130. In step S130, the CPU 71 judges that an anomalous state concerning output of a high voltage occurs because a high voltage is outputted regardless of the high voltage output OFF mode, and executes a backup process for saving current statuses. For example, the backup process includes a process where information indicating which of high voltages is in an anomalous state is stored in the NVRAM 75, and a process where the information is printed on the sheet of paper 3 through the image formation unit 25.

In step S140, error information indicating the anomalous state of the high voltage output is displayed on the LCD monitor 24 which serves as an indication unit. The LCD monitor 24 is driven by DC 3.3V. It should be noted that various types of indication units, such as a buzzer, may be employed for indicating error information.

Next, in step S150, the CPU 71 judges whether the front cover 15 is in the opened state. The CPU 71 waits until the front cover 15 moves to the opened state (S150: NO). When the CPU 71 judges that the front cover 15 is in the opened state (S150: YES), the CPU 71 generates a power supply shutdown signal SS, and supplies the power supply shutdown signal SS to the photocoupler PC1 via the resistance R6 and the diode D5. In response to the power supply shutdown signal SS, the primary side control circuit 61 is inactivated, and the lower voltage power supply unit 60 and the high voltage power supply unit 70 are suspended.

Hereafter, advantages of the first embodiment are explained. When high voltage output is detected in the high voltage OFF mode where the high voltage output is cut off, the CPU 71 inactivates the primary side control circuit 61 with the power supply shutdown signal SS. In this case, the CPU 71 inactivates the primary side control circuit 61 by simply using the photocoupler PC1. Therefore, according to the first embodiment, an interlock switch is not needed. As a result, it becomes possible to stop high voltage output when the anomalous state of the high voltage output is detected without increasing the size of the power supply unit 40 and without increasing cost. In addition, it becomes possible to suppress deterioration of a component (e.g., the photosensitive drum 32 of the image formation unit 25) to which a high voltage is supplied. It should be noted that such anomalous state of the high voltage output is caused, for example, by a faulty operation of the PWM signal generator or abnormal oscillation of the voltage boosting circuit 72.

According to the first embodiment, it is possible to continue to inform a user of the anomalous state of the high voltage output through the LCD monitor 24 as long as possible until the front cover 15 is opened. It is also possible to prevent the user from carelessly touch a high voltage.

As described above, the information concerning the anomalous state of the high voltage output is stored in the NVRAM 75, or is printed out. Therefore, maintenance work for the anomalous state of the high voltage output can be performed more effectively.

Figure 4:
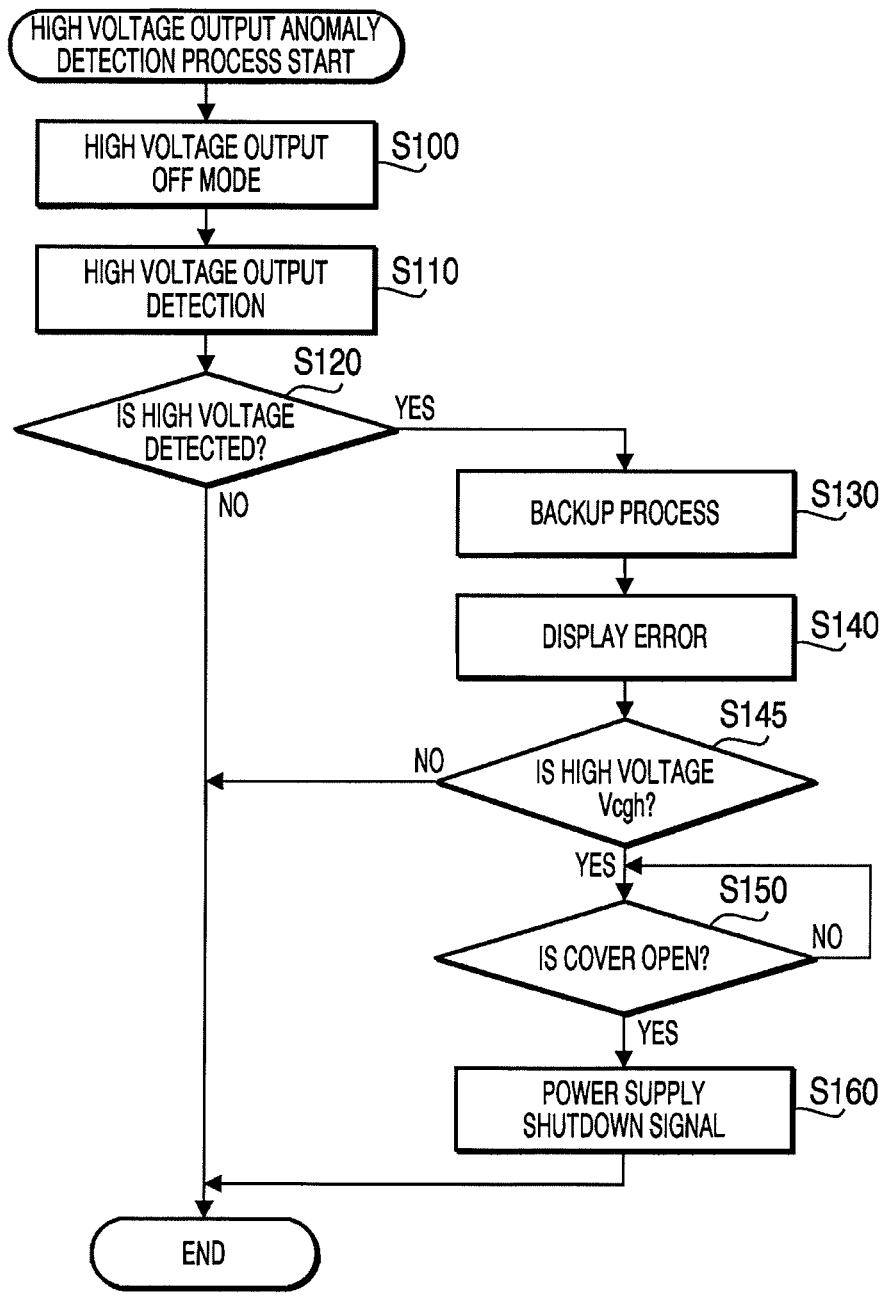
FIG. 4 is a variation of the high voltage output anomaly detection process shown in FIG. 3.

Typically, the charge voltage Vchg applied to the charger 33 has the maximum energy of high voltages to be applied to the components in the image formation unit 25. Therefore, the highest priority for preventing the user to touch the high voltage should be assigned to the charge voltage Vchg. Therefore, as shown in step S145 in FIG. 4, the CPU 71 may judge whether the high voltage is the charge voltage Vchg. In this case, the CPU 71 may execute step S150 and step S160 for the power supply shutdown process only when output of the charge voltage Vchg is in the anomalous state. In this case, the above described advantages can be realized more effectively when the anomalous state of the charge voltage Vchg occurs.

Second Embodiment

Hereafter, a second embodiment is described with reference to FIGS. 5 and 6. Since the feature of the second embodiment corresponds to a variation of the power supply unit of the first embodiment, in the following the explanations focus on the feature of the second embodiment. Therefore, in the following, the same reference numbers as those of the first embodiment are also referred to for the explanation of the second embodiment.

Figure 5:
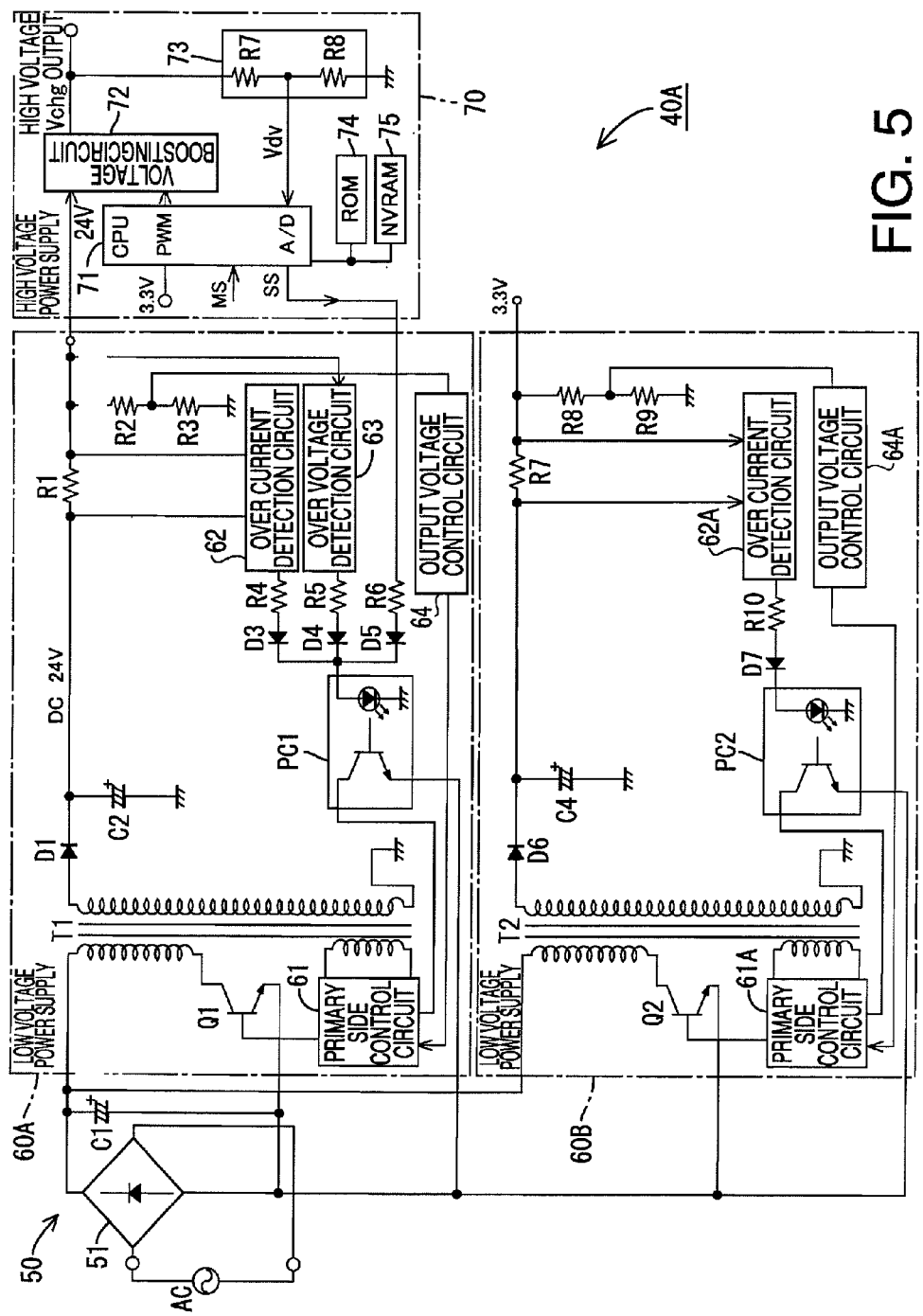
FIG. 5 is a circuit diagram of a power supply unit according to a second embodiment.

FIG. 5 is a circuit diagram of a power supply unit 40A according to the second embodiment. As shown in FIG. 5, the power supply unit 40A includes two low voltage power supply units 60A and 60B. The low voltage power supply unit 60B generates DC 3.3.V. Therefore, in this embodiment, the low voltage power supply unit 60A is configured such that the diode D2 and the capacitor C3 and the DC-DC converter 66 are omitted from the low voltage power supply unit 60 of the first embodiment.

Similarly to the low voltage power supply unit 60A, the low voltage power supply unit 60B is an RCC (Ringing Choke Converter), and includes a converter transformer T2, a switching transistor Q2, a primary side control circuit 61A, a diode D6, a capacitor C4, a overcurrent detection circuit 62A, an output voltage control circuit 64A, and a photocoupler PC2. That is, the low voltage power supply unit 60B is different from the low voltage power supply unit 60A in that the low voltage power supply unit 60B is not provided with a overvoltage detection circuit and does not receive the power supply shutdown signal SS.

In this configuration, when a high voltage larger than or equal to a predetermined voltage is detected in the high voltage output OFF mode, the CPU 71 operates to inactivate only the primary side control circuit 61 of the low voltage power supply unit 60A without inactivating the primary side control circuit 61A of the low voltage power supply unit 60B. That is, when anomalous high voltage is detected, output of DC 24V is stopped, while DC 3.3V is outputted continuously.

Figure 6:
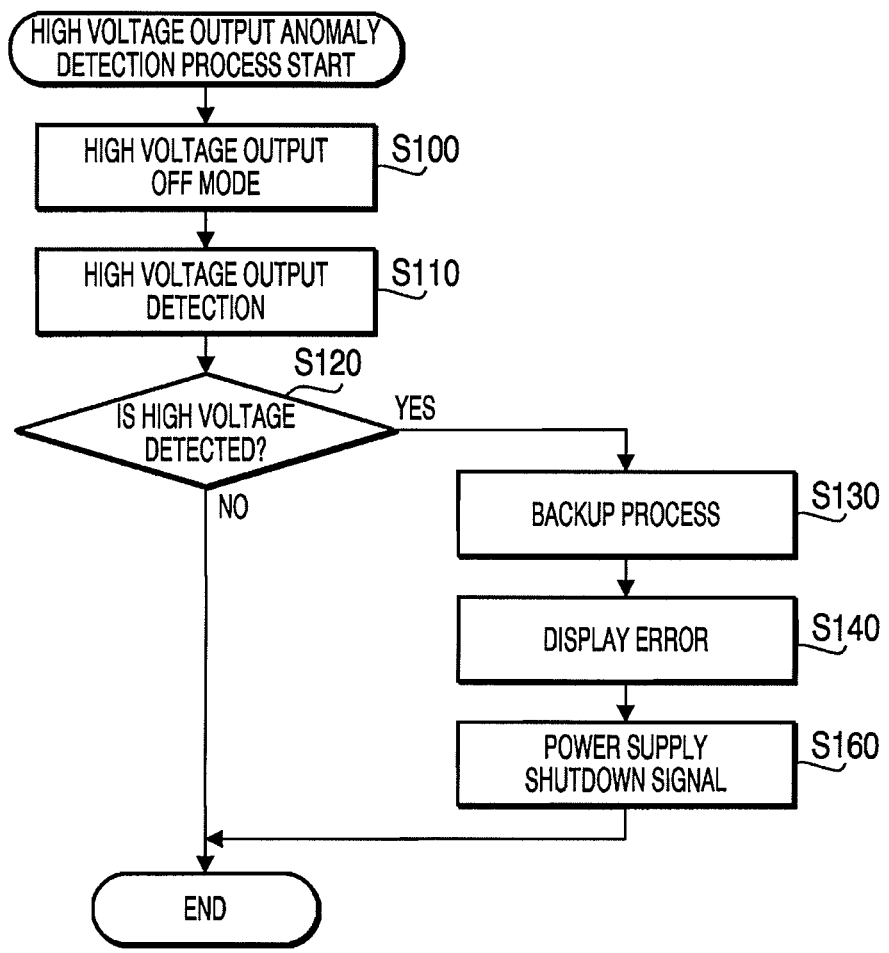
FIG. 6 is a flowchart illustrating a high voltage output anomaly detection process according to the second embodiment.

For this reason, in the high voltage output anomaly detection process shown in FIG. 6 according to the second embodiment, a judgment step for judging whether the front cover 15 is opened in S150 in FIG. 3 is omitted. That is, according to the second embodiment, the low voltage power supply unit 60A is inactivated regardless of whether the front cover 15 is opened or closed.

As a result, it becomes possible to stop the anomalous high voltage output in an early stage and securely, and to inform the user of the anomalous high voltage output through the LCD monitor 24 by using DC 3.3V even if the high voltage output has been stopped. In addition, since the anomalous high voltage output is stopped in an early stage, it becomes possible to suppress deterioration of the component (e.g., the photosensitive drum 32) to which a high voltage is applied in comparison with the case where the primary side control circuit 61 of the low voltage power supply unit 60A is inactivated after the opened state of the front cover 15 is detected. That is, according to the second embodiment, it becomes possible to suppress deterioration of the photosensitive drum 32 due to anomalous high voltage output in compassion with the configuration of the first embodiment.

It should be noted that the resistances R7, R8, R9 and R10 in the low voltage power supply unit 60B respectively correspond to the resistances R1, R2, R3 and R4 in the low voltage power supply unit 60A, and the diode D7 in the low voltage power supply unit 60B corresponds to the diode D3 in the low voltage power supply unit 60A.

Although the present invention has been described in considerable detail with reference to certain preferred embodiments thereof, other embodiments are possible.

Figure 7:
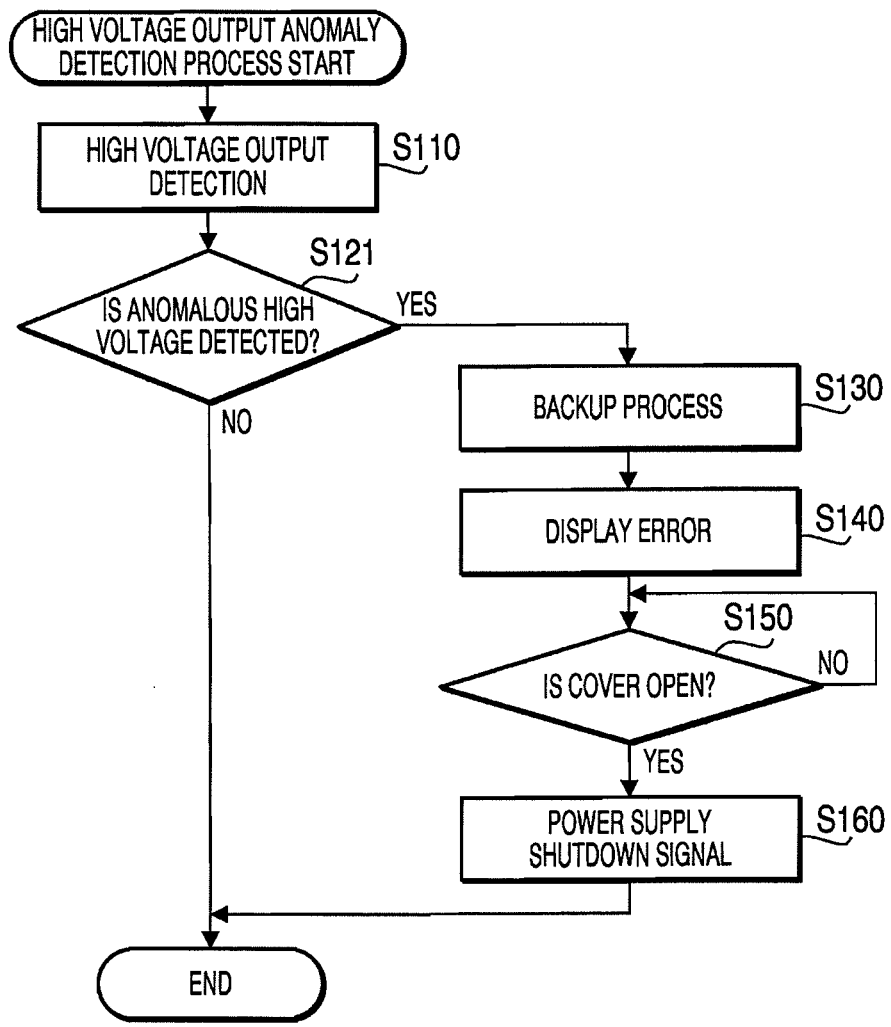
FIG. 7 is a flowchart illustrating a high voltage output anomaly detection process according to another embodiment.

(1) In the above described embodiments, the anomalous high voltage output is detected in the high voltage output OFF mode in which output of a high voltage is stopped. However, the present invention is not limited to such an example. The anomalous high voltage output may be detected regardless of the ON/OFF state of the high voltage output mode. FIG. 7 illustrates a high voltage output anomaly detection process of such a case. As shown in FIG. 7, in this case, step S100 in FIG. 3 is omitted, and in step S121 the CPU judges whether an anomalous high voltage is detected in accordance with the high voltage detection signal Vdv in place of step S120 in FIG. 3. In this case, it is also possible to stop the high voltage output when the anomalous high voltage output is detected without increasing the size of the power supply unit and without increasing cost. Furthermore, it is possible to suppress deterioration of the component due to the anomalous high voltage.

It should be noted that "anomalous high voltage" includes a state where at least one of the high voltages including the charge voltage, the development bias and the transfer bias is outside a predetermined voltage range. That is, "anomalous high voltage" is not limited to the case where the high voltage output exceeds the predetermined range. Factors causing the anomalous high voltage include a faulty operation of the voltage boosting circuit, and an abnormal state concerning the generation of the PWM signal (e.g., a faulty operation of the PWM signal generator or the A-D converter).

(2) In the above described embodiments, the image forming device is configured to have an open/close cover, a detector for detecting the opened or closed state of the cover, and an indication unit. However, the present invention is not limited to such an example. For example, these components may be provided in the power supply unit itself.

(3) In the above described embodiments, the power supply unit (40, 40A) is provided in the image forming device. However, the present invention is not limited to such an example. For example, the power supply unit according to the embodiment can also be applied to various types of devices which require a high voltage.

(4) In the above described embodiments, detection of the anomalous high voltage output is conducted in accordance with the high voltage detection signal Vdv. However, the present invention is not limited to such an example. For example, when high voltage output is controlled by constant current control, the anomalous state in high voltage generation may be detected in accordance with current detection on the side of the high voltage output in place of the voltage detection. That is, the feature of each of the above described embodiments may be applied to the case where the high voltage output is controlled by constant current control in addition to the case where the high voltage output is controlled by constant voltage control.

What is claimed is:

1. A power supply unit, comprising:
a first converter transformer;
a first low voltage generation unit configured to generate a first voltage on a secondary side of the first converter transformer and output the first voltage;
a first controller that controls an activation state of a primary side of the first converter transformer, on the primary side of the first converter transformer, based on the first voltage;
an inactivation unit configured to inactivate operation of the first controller based on the first voltage to let the first low voltage generation unit to suspend output of the first voltage;
a high voltage generation unit that is configured to generate a high voltage higher than the first voltage by using the first voltage and outputs the high voltage, comprising:
a high voltage controller that controls the high voltage generation unit based on the high voltage; and
an anomalous state detection unit configured to detect an anomalous state concerning output of the high voltage of the high voltage generation unit,
wherein the high voltage controller inactivates the operation of the first controller through the inactivation unit when the anomalous state is detected by the anomalous state detection unit,
wherein the power supply unit has an output OFF mode where output of the high voltage is cut off, and
wherein the high voltage controller inactivates the operation of the first controller when the anomalous state detection unit detects that the high voltage is higher than or equal to a predetermined value in the output OFF mode.

2. The power supply unit according to claim 1, further comprising:
a second converter transformer;
a second low voltage generation unit that is configured to generate a second voltage lower than the first voltage on a secondary side of the second converter transformer, and outputs the second voltage;
a second controller that controls an activation state of a primary side of the second converter transformer, on the primary side of the second converter transformer, based on the second voltage; and
an indication unit configured to indicate the anomalous state by using the second voltage,
wherein the high voltage controller inactivates the operation of the first controller without inactivating operation of the second controller when the anomalous state is detected by the anomalous state detection unit.

3. The power supply unit according to claim 2, further comprising:
an open/close cover configured to enable access to the high voltage generation unit in an opened state of the open/close cover; and
an open/close detector configured to detect the opened state of the open/close cover,
wherein the high voltage controller inactivates the operation of the first controller before the opened state of the open/close cover is detected by the open/close detector when the anomalous state is detected.

4. A power supply unit, comprising:
a first converter transformer;
a first low voltage generation unit configured to generate a first voltage on a secondary side of the first converter transformer and output the first voltage;
a first controller that controls an activation state of a primary side of the first converter transformer, on the primary side of the first converter transformer, based on the first voltage;
an inactivation unit configured to inactivate operation of the first controller based on the first voltage to let the first low voltage generation unit to suspend output of the first voltage;
a high voltage generation unit that is configured to generate a high voltage higher than the first voltage by using the first voltage and outputs the high voltage, comprising:
a high voltage controller that controls the high voltage generation unit based on the high voltage; and
an anomalous state detection unit configured to detect an anomalous state concerning output of the high voltage of the high voltage generation unit,
wherein the high voltage controller inactivates the operation of the first controller through the inactivation unit when the anomalous state is detected by the anomalous state detection unit,
wherein the first low voltage generation unit is configured to generate a second voltage lower than the first voltage,
wherein the power supply unit further comprises:
an indication unit configured to indicate the anomalous state by using the second voltage,
an open/close cover configured to enable access to the high voltage generation unit in an opened state of the open/close cover; and
an open/close detector configured to detect the opened state of the open/close cover,
wherein the high voltage controller inactivates the operation of the first controller depending on detection of the opened state of the open/close cover by the open/close detector when the anomalous state of the high voltage is detected.

5. An image forming device, comprising:
a power supply unit comprising:
a first converter transformer;
a first low voltage generation unit configured to generate a first voltage on a secondary side of the first converter transformer and a second voltage lower than the first voltage and output the first voltage;
a first controller that controls an activation state of a primary side of the first converter transformer, on the primary side of the first converter transformer, based on the first voltage;
an inactivation unit configured to inactivate operation of the first controller based on the first voltage to let the first low voltage generation unit to suspend output of the first voltage;
a high voltage generation unit that is configured to generate a high voltage higher than the first voltage by using the first voltage and outputs the high voltage, comprising:
a high voltage controller that controls the high voltage generation unit based on the high voltage,
an anomalous state detection unit configured to detect an anomalous state concerning output of the high voltage of the high voltage generation unit,
an indication unit configured to indicate the anomalous state by using the second voltage,
an open/close cover configured to enable access to the high voltage generation unit of the power supply unit in an opened state of the open/close cover; and
an open/close detector configured to detect the opened state of the open/close cover,
wherein the high voltage controller inactivates the operation of the first controller through the inactivation unit when the anomalous state is detected by the anomalous state detection unit, and
wherein the high voltage controller of the power supply unit inactivates the operation of the first controller depending on detection of the opened state of the open/close cover by the open/close detector when the anomalous state of the high voltage is detected; and
an image formation unit configured to form an image by using the high voltage supplied by the power supply unit.

6. The image forming device according to claim 5, wherein the power supply unit further comprises:
a second converter transformer;
a second low voltage generation unit that is configured to generate a second voltage lower than the first voltage on a secondary side of the second converter transformer, and outputs the second voltage;
a second controller that controls an activation state of a primary side of the second converter transformer, on the primary side of the second converter transformer, based on the second voltage; and
an indication unit configured to indicate the anomalous state by using the second voltage,
wherein the high voltage controller in the power supply unit inactivates the operation of the first controller without inactivating operation of the second controller when the anomalous state is detected by the anomalous state detection unit.

7. The image forming device according to claim 6, further comprising:
- an open/close cover configured to enable access to the high voltage generation unit of the power supply unit in an opened state of the open/close cover; and
- an open/close detector configured to detect the opened state of the open/close cover,
- wherein the high voltage controller inactivates the operation of the first controller before the opened state of the open/close cover is detected by the open/close detector when the anomalous state of the high voltage is detected.

8. The image forming device according to claim 5, wherein:
- the image formation unit comprises a photosensitive body which holds a developer image;
- the image formation unit prints the developer image on a recording medium and prints information concerning the anomalous state of the high voltage; and
- the high voltage controller of the power supply unit operates to print the information concerning the anomalous state of the high voltage and thereafter inactivate the operation of the first controller when the anomalous state of the high voltage is detected.

9. The image forming device according to claim 8, wherein:
- the image formation unit comprises a charger that charges the photosensitive body based on the high voltage output by the high voltage generation unit; and
- the high voltage controller of the power supply unit inactivates the operation of the first controller when the anomalous state concerning output of the high voltage to be supplied to the charger is detected.

* * * * *